(12) United States Patent
Gimeno Monge et al.

(10) Patent No.: US 9,277,409 B2
(45) Date of Patent: Mar. 1, 2016

(54) SECURITY CHIP OF A COMMUNICATION DEVICE

(71) Applicant: ST-Ericsson SA, Plan-les-Ouates (CH)

(72) Inventors: Pablo Ignacio Gimeno Monge, Nice (FR); Frederic Goffin, Singapore (SG); Nikhil Taluja, Southlake, TX (US)

(73) Assignee: ST-ERICSSON SA, Plan-Les-Ouates (CH)

( * ) Notice: Subject to any disclaimer, the term of this patent is extended or adjusted under 35 U.S.C. 154(b) by 0 days.

(21) Appl. No.: 14/394,773

(22) PCT Filed: Apr. 18, 2013

(86) PCT No.: PCT/EP2013/058047
§ 371 (c)(1),
(2) Date: Oct. 16, 2014

(87) PCT Pub. No.: WO2013/160178
PCT Pub. Date: Oct. 31, 2013

(65) Prior Publication Data
US 2015/0111538 A1      Apr. 23, 2015

Related U.S. Application Data

(60) Provisional application No. 61/647,159, filed on May 15, 2012.

(30) Foreign Application Priority Data

Apr. 23, 2012   (EP) ..................................... 12305469

(51) Int. Cl.
*H04M 1/66*      (2006.01)
*H04W 12/08*    (2009.01)
(Continued)

(52) U.S. Cl.
CPC ........... *H04W 12/08* (2013.01); *G06Q 20/3229* (2013.01); *G06Q 20/3278* (2013.01); *H04B 5/0025* (2013.01); *H04L 63/0492* (2013.01); *H04W 12/02* (2013.01)

(58) Field of Classification Search
CPC ..................................................... H04W 12/08
USPC .......................................................... 455/410
See application file for complete search history.

(56) References Cited

U.S. PATENT DOCUMENTS 8,200,281 B2 * 6/2012 Yeh ................................ 455/558
2008/0155257 A1   6/2008 Werner et al.
(Continued)

FOREIGN PATENT DOCUMENTS

EP     1 975 855 A1    10/2008
GB     2 298 613 A      9/1996

OTHER PUBLICATIONS

International Search Report issued in corresponding International application No. PCT/EP2013/058047, date of mailing Jun. 5, 2013.
(Continued)

*Primary Examiner* — Santiago Garcia
(74) *Attorney, Agent, or Firm* — Patent Portfolio Builders PLLC

(57) ABSTRACT

The invention concerns a security chip of a communication device, comprising: a near field communication interface (37), a first processing unit (42), a first non volatile storage capability (45), adapted to store first information related to near field communication, and connected to be accessed, from outside the security chip, through said near field communication interface (37), under the control of said first processing unit (42), wherein it also comprises a second non volatile storage capability (48), adapted to store second information related to near field communication different from said first information, and connected to be accessed, from outside the security chip, independently from said first processing unit (42).

14 Claims, 3 Drawing Sheets

(51) Int. Cl.
*H04L 29/06* (2006.01)
*H04W 12/02* (2009.01)
*G06Q 20/32* (2012.01)
*H04B 5/00* (2006.01)

(56) References Cited

U.S. PATENT DOCUMENTS

2008/0155258 A1* 6/2008 Obereiner et al. ............ 713/168
2008/0219444 A1   9/2008 Benteo et al.
2009/0006845 A1* 1/2009 Charbonnier et al. ........ 713/156
2009/0275364 A1   11/2009 Morel et al.
2011/0237221 A1* 9/2011 Prakash et al. ................ 455/411
2012/0314865 A1* 12/2012 Kitchen ......................... 380/270
2012/0329388 A1* 12/2012 Royston et al. .............. 455/41.1
2013/0086385 A1* 4/2013 Poeluev ........................ 713/176
2013/0244795 A1* 9/2013 Waxman et al. ................ 463/46

OTHER PUBLICATIONS

Extended European Search Report issued in corresponding European application No. 12 30 5469, date of completion of the search Dec. 11, 2012.

* cited by examiner

SECURITY CHIP OF A COMMUNICATION DEVICE

TECHNICAL FIELD

The invention relates to a security chip of a communication device including a Near Field Communication function, to a communication device including a security chip and including a Near Field Communication function, to methods of storing information in such a security chip and in such a communication device.

BACKGROUND

Near Field Communication (NFC) is a short range radio technology which is preferably based on the inductive coupling of two loop antennae resonating at 13.56 MHz. Typical data rates are in the range of 100 to 400 Kbps, and communication distance is in the range of several centimeters. Typical applications include secure transactions for payment and ticketing. Secure NFC applications require the addition to the system of one or more security chips to hold sensitive information, like Credit Card numbers, transportation system subscriptions, etc. Security chips include some non volatile storage capacity. Those security chips may be accessed through interfaces and protocols which are for example defined by the standards ETSI 102613/102622. NFC applications can be of several types, for example peer to peer applications, or read and write applications, or card emulation applications.

More and more NFC devices are to be integrated with other wireless communication units into communication devices, like combined connectivity devices, for example into mobile phones. Those other wireless communication units may be for example Bluetooth, FM Radio, and/or GNSS location, which may be integrated with a NFC function, altogether in the same chip. To perform the NFC function correctly, some configuration parameters of the NFC function will need to be stored in a persistent way, which means in a non volatile storage capacity.

According to a first prior art, since the state of the art technologies used to implement these wireless units do not provide cost effective ways to implement on-chip non volatile storage, dedicated external storage peripherals, for example an EEPROM, are often used to store these NFC function configuration parameters. However this dedicated external storage peripheral involves extra cost and extra complexity to the communication device including it.

According to a second prior art, for example described in US 2008/155258, it is known a memory module including a NFC component, a security processor, and several flash memories. However, in this second prior art, all flash memories are accessed through the security processor. So none of available non volatile memories of this prior art is efficient since it requires access under the control of security processor, and NFC function configuration parameters need to be accessed before being able to start communicating with the security processor. Besides, the memory module is not a security chip since it does include a NFC component.

According to a third prior art, for example described in US 2008/155257, it is known a memory module including a NFC component, a security processor, and several non volatile memories. However, in this third prior art, all non volatile memories are accessed through the security processor. The only memory, which is not accessed through the security processor, is a volatile memory. So none of available non volatile memories of this prior art is efficient since it requires access under the control of security processor, and NFC function configuration parameters need to be accessed before being able to start communicating with the security processor. The only directly accessible memory is not efficient either, since it is not adapted to store information which needs to be kept even when the communication device is off. Besides, the memory module is not a security chip since it does include a NFC component.

SUMMARY

An object of the embodiments is to alleviate at least partly the above mentioned drawbacks.

More particularly, the embodiments aim to provide a non volatile storage capacity adapted to store information related to NFC and which is at the same time efficient and cost effective.

First sensitive information related to NFC is already stored in a first non volatile storage capacity, for example in a non volatile memory, of the security chip. This non volatile storage capacity can only be accessed through the security processor of the security chip, for obvious security reasons.

Second information related to NFC, like for example NFC configuration parameters, may need to be stored in a persistent way, so in a non volatile storage capacity, and may be needed straightaway, for example they may be needed even before starting to communicate with the security processor of the security chip, because for example they may be information related to NFC which are a prerequisite to activate NFC function.

Therefore, it seems more logical to store this second information related to NFC outside the security chip so that it can be accessed without going through the security processor of the security chip.

According to some embodiments, it has been found that storing this second information related to NFC in a separate component costs place and adds complexity.

According to some embodiments, it has been found that storing this second information related to NFC in an already existing connectivity chip saves place but it adds costs since existing connectivity chips use deep sub-micron technologies, for example below 65 nm nowadays; therefore implementing a new non volatile storage capacity in such a connectivity chip would be expensive, even if it saves room.

According to some embodiments, the choice has been made to implement a non volatile storage capacity inside the security chip to store this second information related to NFC, in order to benefit from existing security chip, all the more that the security element very often uses a cheaper, and even often much cheaper, technology than the connectivity chips. So implementation of a new non volatile storage capacity would be cheaper there.

According to some embodiments, the choice has been made to implement a non volatile storage capacity inside the security chip in such a way that it can be accessed independently of the security processor controlling the security chip. Implementing a non volatile storage capacity inside the security chip, which can be accessed independently of the security processor, which security processor is supposed to control all the sensitive information content stored in non volatile storage capacity, at least all the sensitive information related to NFC, overcomes a prejudice in the art of security chips.

According to some embodiments, a security chip based non volatile storage unit is presented, which relieves an integrated NFC system from incurring additional costs, either due to costly process options for on-chip non volatile storage, or due to the need of additional components for external non volatile storage.

This object and other objects may be achieved with a security chip of a communication device, comprising a near field communication interface, a first processing unit, a first non volatile storage capability, adapted to store first information related to near field communication, and connected to be accessed, from outside the security chip, through said near field communication interface, under the control of said first processing unit, wherein it also comprises a second non volatile storage capability, adapted to store second information related to near field communication different from said first information, and connected to be accessed, from outside the security chip, independently from said first processing unit.

According to some embodiments, said first processing unit controls the access to said first non volatile storage capability from outside the security chip through said near field communication interface. Said first processing unit controls if and how said first non volatile storage capability can be accessed from outside the security chip through said near field communication interface. Said first processing unit controls if and how said first non volatile storage capability can be read from outside the security chip through said near field communication interface and said first processing unit controls if and how said first non volatile storage capability can be written from outside the security chip through said near field communication interface. Preferably, said first processing unit authorizes or refuses access, and manages access to said first non volatile storage capability from outside the security chip through said near field communication interface. Said authorization includes a successful identification step. Said first processing unit is the security processor of the security chip.

According to some embodiments, said second non volatile storage capability is adapted to store second information related to near field communication different from said first information, and is connected to be accessed, from outside the security chip, either under no control of any processing unit or under the control of another processing unit different from said first processing unit. Preferably, said another processing unit is dedicated to control only said second non volatile storage capability. Preferably, said second information is needed before starting a near field communication transaction, which means said second information is a prerequisite to start a near field communication transaction, whereas said first information is used to start and manage safely a near field communication transaction. Preferably, this control of said another processing unit is lighter than the control of said first processing unit.

According to some embodiments, a non volatile storage capability is either a non volatile memory or one or more of several zones of a non volatile memory which can be accessed independently of the other zones of this non volatile memory, or a group of non volatile memories.

According to some embodiments, said second non volatile storage capability is connected to be accessed, from outside the security chip, independently from said first processing unit. The access control to said second non volatile storage capability, if any, is not performed by said first processing unit.

Preferred embodiments comprise one or more of the following features:
said second non volatile storage capability is connected to be accessed, from outside the security chip, directly, independently from any processing unit.
a telecommunication interface and/or another interface.
a second processing unit adapted to operate independently from said first processing unit, and a third non volatile storage capability, adapted to store third information related to telecommunication, and connected to be accessed, from outside the security chip, through said telecommunication interface, under the control of said second processing unit.
both said first and second processing units are located in a single and same processor including a firewall to separate said first and second processing units from each other.
said second non volatile storage capability is connected to be accessed, from outside the security chip, either through said telecommunication interface or through said another interface.
said another interface is dedicated only to access said second non volatile storage capability.
said second non volatile storage capability is connected to be accessed, from outside the security chip, through said near field communication interface.

This object and other objects may also be achieved with a communication device including:
a security chip comprising a first non volatile storage capability, adapted to store first security information related to near field communication, a second non volatile storage capability, adapted to store second configuration information related to near field communication, a third non volatile storage capability, adapted to store third security information related to telecommunication,
a near field communication chip comprising a near field communication processing unit and being connected to said security chip so as to have access to said first and second storage capabilities of said security chip and so as to have no access to said third storage capability of said security chip,
a telecommunication chip comprising a telecommunication processing unit and being connected to said security chip so as to have access to said third storage capability of said security chip and so as to have no access to said first and second storage capabilities of said security chip.

Preferred embodiments comprise one or more of the following features:
a communication device including a security chip according to embodiments, a telecommunication chip comprising a telecommunication processing unit and being connected to said security chip so as to have access at least to a storage capability of said security chip, a near field communication chip comprising a near field communication processing unit and being connected to said security chip so as to have access at least to a storage capability of said security chip.
said first information is security information related to near field communication, said second information is configuration information related to near field communication.
said first security information related to near field communication is the information needed by said near field communication chip before starting a near field communication transaction with a device external to said communication device, said second configuration information related to near field communication is the information needed by said near field communication chip to start and manage safely a near field communication transaction with a device external to said communication device.
said security chip is manufactured using a first technology, said telecommunication chip and/or said near field communication chip are manufactured using a second technology, said first technology provides simpler and easier manufacturing process than said second technology.

This object and other objects may also be achieved with a method to store information in a security chip of a communication device, including:

storing, in a first non volatile storage capability of said security chip, first information related to near field communication, and accessing said first non volatile storage capability, from outside the security chip, through a near field communication interface of said security chip, under the control of a processing unit of said security chip, storing, in a second non volatile storage capability of said security chip, second information related to near field communication different from said first information, and accessing said second non volatile storage capability, from outside the security chip, independently from any processing unit of said security chip.

This object and other objects may also be achieved with a method to store information in a communication device, including:

storing information in a security chip in a first non volatile storage capability, first security information related to near field communication, in a second non volatile storage capability, second configuration information related to near field communication, in a third non volatile storage capability, third security information related to telecommunication, from a near field communication chip of said communication device, accessing said first and second storage capabilities of said security chip and not being able to access said third storage capability of said security chip, from a telecommunication chip of said communication device, accessing said third storage capability of said security chip and not being able to access said first and second storage capabilities of said security chip.

This object and other objects may also be achieved with a computer program product comprising a computer readable medium, having thereon a computer program comprising program instructions, the computer program being loadable into a data-processing unit and adapted to cause execution of the method according to embodiments when the computer program is run by the data-processing unit.

According to some embodiments, said telecommunication interface is an interface to a telecommunication processing unit which is external to said security chip. Telecommunication is preferably wireless phone communication in a mobile phone communication network.

According to some embodiments, said second technology uses narrower paths on printed circuit than said first technology. Said second technology is more compact than said first technology.

According to some embodiments, said security chip is preferably a SIM (Subscriber Identity Module) card.

According to some embodiments, said communication device is a user equipment, and preferably a mobile phone, including near field communication functionality and preferably telecommunication functionality.

Further features and advantages will appear from the following description of embodiments, given as non-limiting examples, with reference to the accompanying drawings listed hereunder.

DETAILED DESCRIPTION OF THE INVENTION

In the following text, even if a memory is a sort of storage capacity, memory and storage capacity will be used indifferently. What will be said about memory could also be said about another storage capacity. For example, a storage capability can be a memory, or can encompass several memories, or can be limited to a specific area of a given memory.

Figure 1:
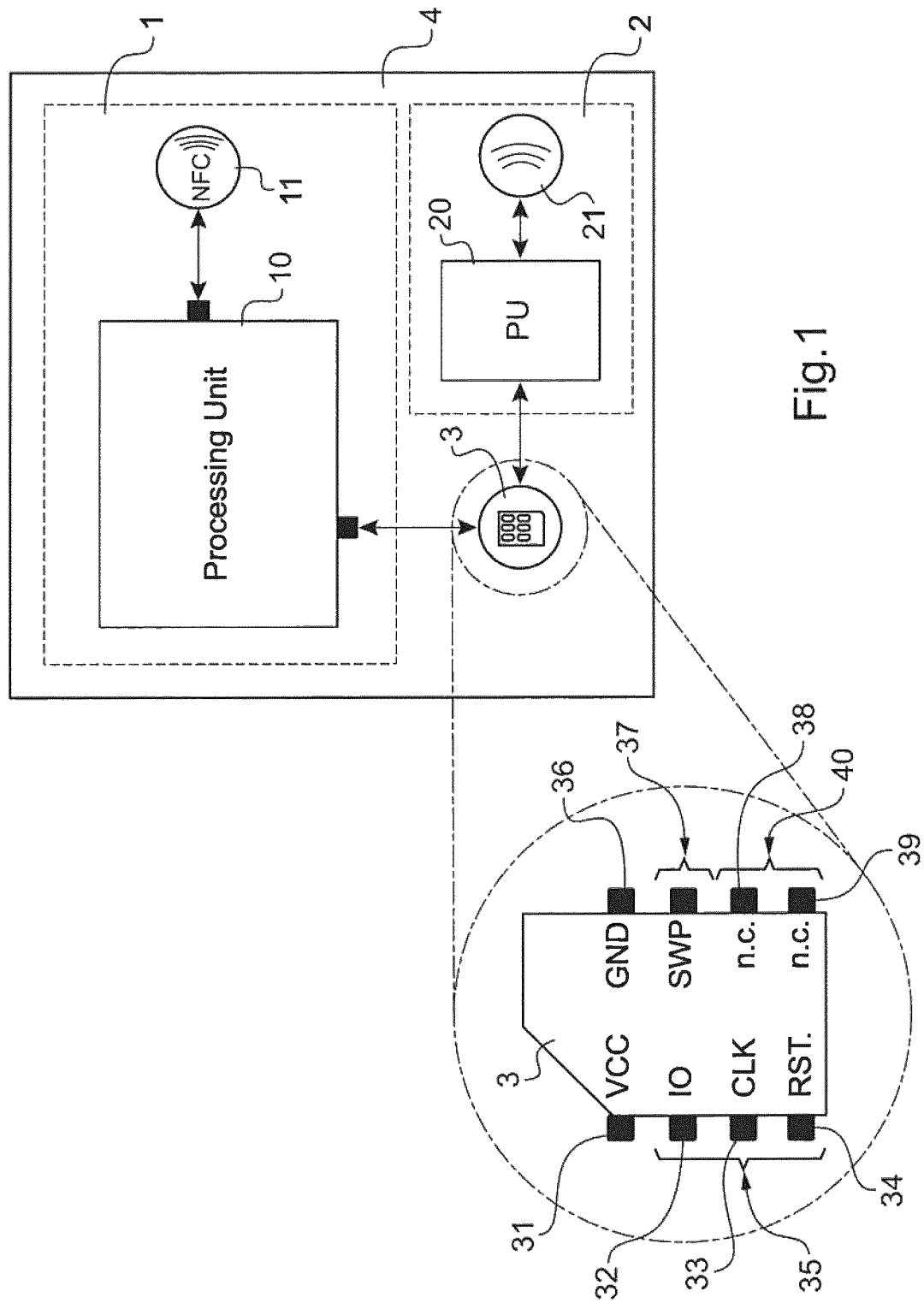
FIG. 1 shows an example of a communication device according to some embodiments.

FIG. 1 shows an example of a communication device according to some embodiments. The communication device 4 comprises at least a NFC unit 1, a telecommunication unit 2 and a security chip 3. The communication device 4 may of course comprise other connectivity units not shown on the FIG. 1. Conical shape in dotted lines shows a zoom of the security chip 3. NFC unit 1 includes a NFC chip and a NFC antenna. Telecommunication unit 2 includes a telecommunication chip and a telecommunication antenna.

The security chip 3 is for example a SIM card. The security chip 3 presents for example eight pins. Among those eight pins, there are a pin VCC 31, a pin GND 36, a pin IO 32, a pin CLK 33, a pin RST 34, a pin SWP 37, and two free pins 38 and 39 noted n.c. (for non connected). The pin VCC 31 is for the alimentation source. The pin GND 36 is for the ground. Pins IO (for input/output) 32, CLK (for clock) 33 and RST (for reset) 34, belong to the legacy interface 35 used by the security chip 3 to communicate with the telecommunication unit 2. The pin SWP 37 is the NFC interface and is used by the security chip 3 to communicate with the NFC unit 1. The two free pins 38 and 39 belong to a free interface 40, usually neither used by NFC function nor used by telecommunication function.

The NFC unit 1 comprises a NFC processor 10 and a NFC antenna 11. The NFC processor 10 is connected to the NFC antenna 11 in a bidirectional way, in order to receive information from and to send information to the NFC antenna 11. The NFC processor 10 is connected to the security chip 3 in a bidirectional way, in order to receive information from and to send information to the security chip 3. The telecommunication processor 20 communicates with the security chip 3 at least through NFC interface 37 so as to have access at least to a storage capability of said security chip 3.

The telecommunication unit 2 may be for example a wireless telecommunication unit like a mobile phone communication unit. The telecommunication unit 2 comprises a telecommunication processor 20 and a telecommunication antenna 21. The telecommunication processor 20 is connected to the telecommunication antenna 21 in a bidirectional way, in order to receive information from and to send information to the telecommunication antenna 21. The telecommunication processor 20 is connected to the security chip 3 in a bidirectional way, in order to receive information from and to send information to the security chip 3. The telecommunication processor 20 communicates with the security chip 3 through legacy interface 35 so as to have access at least to a storage capability of said security chip 3.

Preferably, the security chip 3 is manufactured using a first technology, whereas the telecommunication chip 2 and/or said near field communication chip 1 are manufactured using a second technology. The first technology provides simpler and easier manufacturing process than the second technology. The first technology is cheaper than the second technology.

Figure 2:
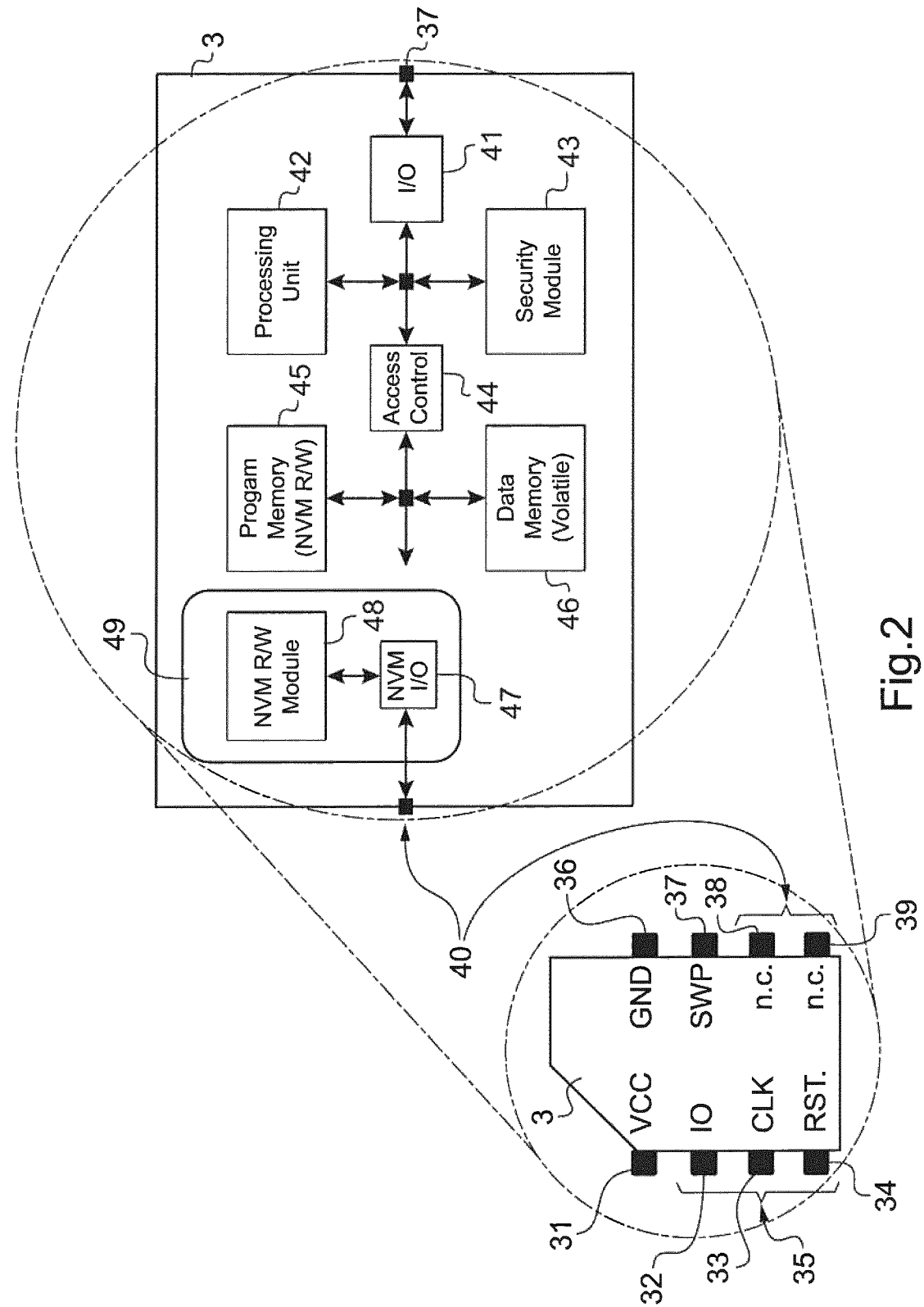
FIG. 2 shows an example of a security chip of a communication device according to some embodiments.

FIG. 2 shows an example of a security chip of a communication device according to some embodiments. Conical shape in dotted lines shows a zoom of security chip 3.

The security chip 3 comprises a NFC interface 37, an input/output unit 41, a security processor 42, a security module 43 containing for example encryption code, a access controller 44, a first non volatile storage capability 45 which is adapted to store first information related to NFC, and connected to be accessed, from outside the security chip 3, through the NFC interface 37, under the control of the security processor 42, a volatile memory 46 adapted to store data which do not need to be stored in a persistent way, like for example the different steps of a NFC transaction with a device external to the communication device 4. The input/output unit 41 is connected to the NFC interface 37. The input/output unit 41, the security processor 42, the security module 43 and the access controller 44 are all connected together. The access controller 44, the first non volatile storage capability 45 and the volatile memory 46 are all connected together. All connections are bidirectional.

The security chip 3 also comprises a second non volatile storage capability 48 which is adapted to store second information related to NFC different from the first information related to NFC stored in the first non volatile storage capability 45, and connected to be accessed, from outside the security chip 3, independently from said security processor 42, and input/output unit 47. The input/output unit 47 is connected to the free interface 40. The input/output unit 47 is connected to the second non volatile storage capability 48 which can be accessed directly from outside the security chip 3, that is independently from any processor of the security chip 3, only through the input/output unit 47. All connections are bidirectional. The block 49 comprising the second non volatile storage capability 48 and the input/output unit 47 is the new element added in the security chip 3 according to some embodiments: it contains no processor.

The security chip 3 may also comprise a second processing unit adapted to operate independently from security processor 42 and a third non volatile storage capability, adapted to store third information related to telecommunication, and connected to be accessed, from outside the security chip 3, through the telecommunication interface 35 which is the legacy interface, under the control of this second processing unit. The second processing unit and the associated third non volatile storage capability are not shown on FIG. 2. Preferably, both the security processor 42 and the second processing unit are located in a single and same processor including a firewall to separate them from each other.

In an embodiment, the second non volatile storage capability 48 is connected to be accessed, from outside the security chip 3, either through the telecommunication interface 35 or through said another interface, for example through the free interface 40 as shown on FIG. 2. Preferably, this free interface 40 is dedicated only to access the second non volatile storage capability 48.

In another embodiment not shown, the second non volatile storage capability 48 is connected to be accessed, from outside the security chip 3, through the NFC interface 37. Then, the NFC 37 will be shared between access under the control of the security processor 42 and direct access independently from the security processor 42. The input/output unit 41 shall manage those two different types of access, so that only access to second non volatile storage capability 48 can be performed independently from the security processor 42, and access to first non volatile storage capability 45 can be performed only under the control of the security processor 42.

The proposed system provides non volatile storage capabilities on an already existing system component, which is the security element embedded in the security chip 3, without requiring additional technology options for on-chip storage or a dedicated external storage device.

In an embodiment, the security chip 3 comprises a first non volatile storage capability 45 and a second non volatile storage capability 48 as shown on FIG. 2, as well as a third non volatile storage capability as not shown on FIG. 2. So, coming back to FIG. 1, the NFC processor 10 is connected to the security chip 3 so as to have access to the first 45 and second 48 storage capabilities and so as to have no access to this third storage capability. In the same way, the telecommunication processor 20 is connected to the security chip 3 so as to have access to this third storage capability and so as to have no access to the first 45 and second 48 storage capabilities.

Preferably, the first information stored in the first non volatile storage capability 45 is security information related to NFC. Preferably, the second information stored in the second non volatile storage capability 48 is configuration information related to NFC. More preferably, this second configuration information is the information needed by the NFC processor 10 before starting a NFC transaction with a device external to the communication device 4. More preferably, this first security information is the information needed by the NFC processor 10 to start and manage safely a NFC transaction with a device external to the communication device 4.

The following embodiments present several possibilities to provide access to the second non volatile storage capability 48. In the alternative second and third embodiments, an off the shelf two pin communication interface like I2C could be used.

In a first embodiment, the NFC interface 37 is used to access the second non volatile storage capability 48. This NFC interface 37 is detailed in standards ETSI 102613 and ETSI 102622. This NFC interface 37 may be enhanced with a proprietary access mode. The first embodiment provides a blended access with the already existing NFC interface 37. This approach is the most compact, as it does not require any additional interface to operate.

In an alternative second embodiment, the legacy interface 35 or telecommunication interface 35 is used to access the second non volatile storage capability 48. This legacy interface 35 is detailed in standard ISO/IEC 7816. A proprietary access mode can be implemented to use this legacy interface 35. For example, the pins 32 and 33 may be used to access the second non volatile storage capability 48 while keeping the RST signal asserted on the pin 34, in order to prevent the internal legacy interface block to be triggered by the accesses to the second non volatile storage capability 48. This second embodiment provides a security enhanced alternative, as the NFC interface 37 is left unchanged, and no risk on NFC security is incurred. The reuse of the existing legacy interface 35 will require interface sharing as well, but the security risk is lower than when sharing the NFC interface 37. Also, timing requirements are lower to use the legacy interface 35 than the NFC interface 37, so access timing constraints will be lower too.

In an alternative third embodiment, shown in FIG. 2, the free interface 40 is dedicated to the second non volatile storage capability 48 only. This third embodiment provides a solution which is security risk completely free, as the interface used to access the dedicated storage bank is physically separated of any of the already existing interfaces used for other functions, like the NFC function and the telecommunication function. The second non volatile storage capability 48 is also independent of the security system, independent of the security processor 42 and of all the other elements, 41, 43 to 46 connected to the security processor 42, and independent of the telecommunication system as well, the second processing unit and the third non volatile storage capacity already described earlier. Therefore, the complete storage solution can be seen as a zero security risk for the security system embedded in the security chip 3.

Figure 3:
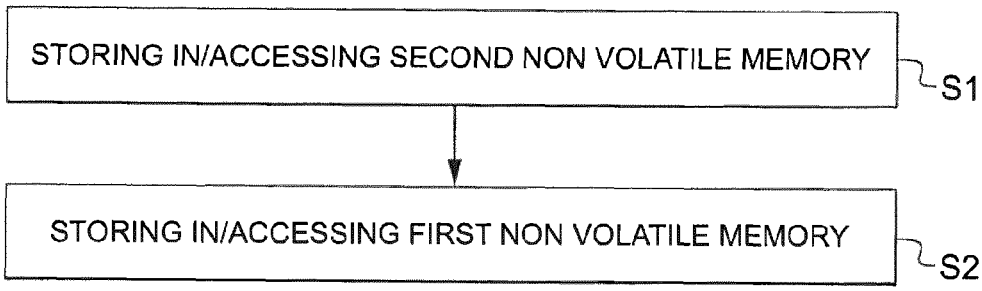
FIG. 3 shows an example of a method of storing information in a security chip of a communication device according to some embodiments.

FIG. 3 shows an example of a method of storing information in a security chip 3 of a communication device 4 according to some embodiments. The method comprises a storing and accessing step S1 and a storing and accessing step S2, the step S1 being preferably performed before the step S2.

In the storing and accessing step S1, some second information also related to NFC but different from previous first information related to NFC is stored, in a second non volatile storage capability 48 of the security chip 3 which may be accessed, from outside the security chip 3, independently from any processing unit of the security chip 3.

In the storing and accessing step S2, some first information related to NFC is stored, in a first non volatile storage capability 45 of the security chip 3 which may be accessed, from outside the security chip 3, through a NFC interface 37 of the security chip 3, under the control of the security processor 42 of the security chip 3.

Figure 4A:
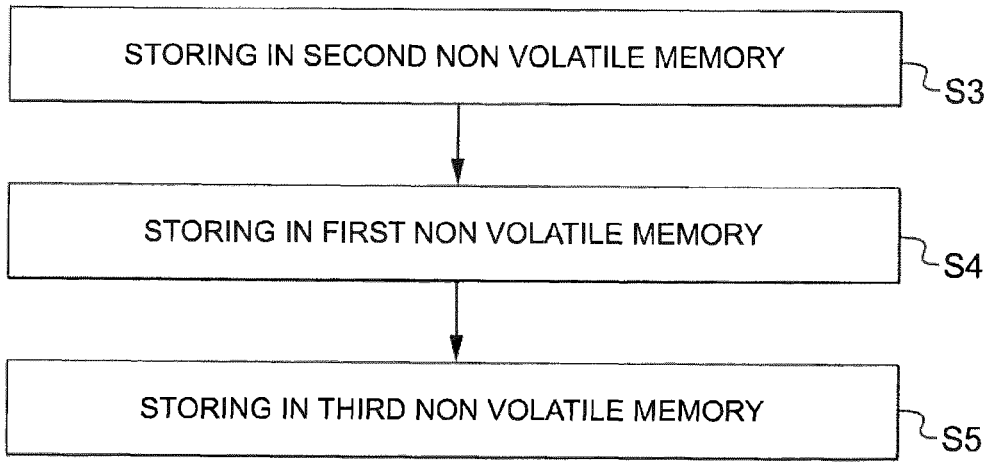
FIGS. 4A, 4B and 4C, show an example of a method of storing information in a communication device according to some embodiments.
Figure 4B:
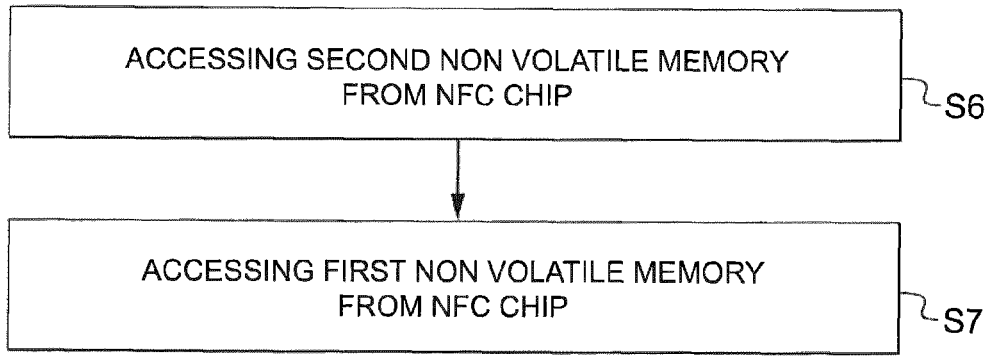
Figure 4C:
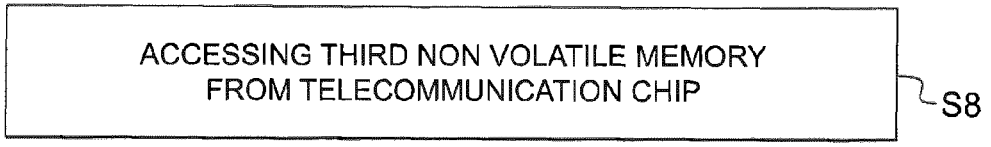

FIGS. 4A, 4B and 4C, show an example of a method of storing information in a communication device 4 according to some embodiments.

In FIG. 4A, this method stores information in the security chip 3, in the following manner. In the second non volatile storage capability 48, second configuration information related to NFC is stored in a step S3. In the first non volatile storage capability 45, first security information related to NFC is stored in a step S4. In the third non volatile storage capability, third security information related to telecommunication is stored in a step S5. Steps S3 and S4 are preferably successive. Order of performance of step S5 with respect to steps S3 and S4 is preferably indifferent.

In FIG. 4B, from the near field communication processor 10, the second non volatile storage capacity 48 is accessed in a step S6 and the first non volatile storage capacity 45 in a step S7. The third non volatile storage capability of the security chip 3 cannot be accessed through the near field communication processor 10. Steps S6 and S7 are preferably performed successively.

In FIG. 4C, from the telecommunication processor 20, the third storage capability of the security chip 3 is accessed in a step S8. The first non volatile storage capacity 45 and the second non volatile storage capacity 48 of the security chip 3 cannot be accessed through the telecommunication processor 20.

The invention has been described with reference to example embodiments. However, many variations are possible within the scope of the invention.

The invention claimed is:

1. A security chip of a communication device, comprising:
    a near field communication interface,
    a security processing unit, and
    a security information non-volatile storage capability storing security information related to near field communication, and connected to the near field communication interface so that it is accessible from outside the security chip exclusively under the control of said security processing unit, wherein the security information is information needed by said near field communication chip before starting a near field communication transaction with a device external to said communication device, and
    a second non-volatile storage capability storing configuration information related to near field communication different from said first information, and connected so that it is accessible from outside the security chip independently from said security processing unit, wherein the configuration information is information needed by said near field communication chip to start and safely manage a near field communication transaction with a device external to said communication device.

2. The security chip according to claim 1, wherein:
    said second non-volatile storage capability is connected so that it is accessible from outside the security chip directly, independently from any processing unit.

3. The security chip according to claim 1, wherein it also comprises:
    a telecommunication interface and/or another interface.

4. The security chip according to claim 3, wherein it comprises:
    a second processing unit independently operable from said security processing unit, and
    a third non-volatile storage capability storing telecommunication information, and connected so that is it accessible from outside the security chip through said telecommunication interface, under the control of said second processing unit.

5. The security chip according to claim 4, wherein:
    both said security and second processing units are located in a single and same processor including a firewall to separate said security and second processing units from each other.

6. The security chip according to claim 3, wherein:
    said second non-volatile storage capability is accessible from outside the security chip either through said telecommunication interface or through said another interface.

7. The security chip according to claim 6, wherein:
    said another interface is dedicated only to access said second non-volatile storage capability.

8. The security chip according to claim 1, wherein:
    said second non-volatile storage capability is accessible from outside the security chip through said near field communication interface.

9. A communication device including:
    a security chip comprising:
        a first non-volatile storage capability, adapted to store first security information related to near field communication,
        a second non-volatile storage capability, adapted to store second configuration information related to near field communication,
        a third non-volatile storage capability, adapted to store third security information related to telecommunication,
    a near field communication chip comprising a near field communication processing unit and being connected to said security chip so as to have access to said first and second storage capabilities of said security chip and so as to have no access to said third storage capability of said security chip, and
    a telecommunication chip comprising a telecommunication processing unit and being connected to said security chip so as to have access to said third storage capability of said security chip and so as to have no access to said first and second storage capabilities of said security chip, wherein the second configuration information is information needed by said near field communication chip to start and safely manage a near field communication transaction with a device external to said communication device.

10. A communication device including:
   a security chip according to claim 1,
   a telecommunication chip comprising a telecommunication processing unit and being connected to said security chip so as to have access at least to one of the storage capabilities of said security chip, and
   a near field communication chip comprising a near field communication processing unit and being connected to said security chip so as to have access at least to one of the storage capabilities of said security chip.

11. The communication device according to claim 9, wherein:
   said security chip is manufactured using a first technology,
   said telecommunication chip and/or said near field communication chip are manufactured using a second technology, and
   said first technology provides simpler and easier manufacturing process than said second technology.

12. A method to store information in a security chip of a communication device, including:
   storing, in a security information non-volatile storage capability of said security chip, security information related to near field communication, wherein the security information is information needed by said near field communication chip before starting a near field communication transaction with a device external to said communication device,
   providing access to said security information non-volatile storage capability from outside the security chip through a near field communication interface of said security chip exclusively under the control of a security processing unit of said security chip, and
   storing, in a second non-volatile storage capability of said security chip, configuration related to near field communication different from said first information, wherein the configuration information is information needed by said near field communication chip to start and safely manage a near field communication transaction with a device external to said communication device, and
   providing access to said second non-volatile storage capability, from outside the security chip, independently from the security processing unit of said security chip.

13. A method to store information in a communication device, including:
   storing information in a security chip:
      in a security information non-volatile storage capability, security information related to near field communication,
      in a second non-volatile storage capability, configuration information related to near field communication,
      in a third non-volatile storage capability, security information related to telecommunication,
   providing access from a near field communication chip of said communication device to said security information and second storage capabilities of said security chip and preventing access from the near field communication chip to said third storage capability of said security chip, and
   providing access from a telecommunication chip of said communication device to said third storage capability of said security chip and preventing access from the telecommunication chip to said first and second storage capabilities of said security chip.

14. A computer program product comprising a non-transitory computer readable medium, having thereon a computer program comprising program instructions, the computer program being loadable into a data-processing unit and adapted to cause execution of the method according to claim 12 when the computer program is run by the data-processing unit.

* * * * *